(No Model.) 2 Sheets—Sheet 1.

D. HOLCOMB.
WIND WHEEL.

No. 536,080. Patented Mar. 19, 1895.

WITNESSES
G. S. Elliott
E. W. Johnson

Daniel Holcomb
INVENTOR
by [signature] Attorney (No Model.) 2 Sheets—Sheet 2.

D. HOLCOMB.
WIND WHEEL.

No. 536,080. Patented Mar. 19, 1895.

WITNESSES
G. S. Elliott
E. W. Johnson

Daniel Holcomb
INVENTOR by [signature]
Attorney

UNITED STATES PATENT OFFICE.

DANIEL HOLCOMB, OF ASHTON, SOUTH DAKOTA.

WIND-WHEEL.

SPECIFICATION forming part of Letters Patent No. 536,080, dated March 19, 1895.

Application filed December 6, 1894. Serial No. 530,992. (No model.)

*To all whom it may concern:*

Be it known that I, DANIEL HOLCOMB, a citizen of the United States of America, residing at Ashton, in the county of Spink and State of South Dakota, have invented certain new and useful Improvements in Wind-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a wind-wheel which is mounted on a vertical rotary shaft with means whereby the wings or blades will be opened and closed automatically so that the wind will impart a rotary motion to the wheel.

The invention consists in the construction and combination of the parts, as will be hereinafter fully set forth and particularly pointed out in the claims.

Figure 1:
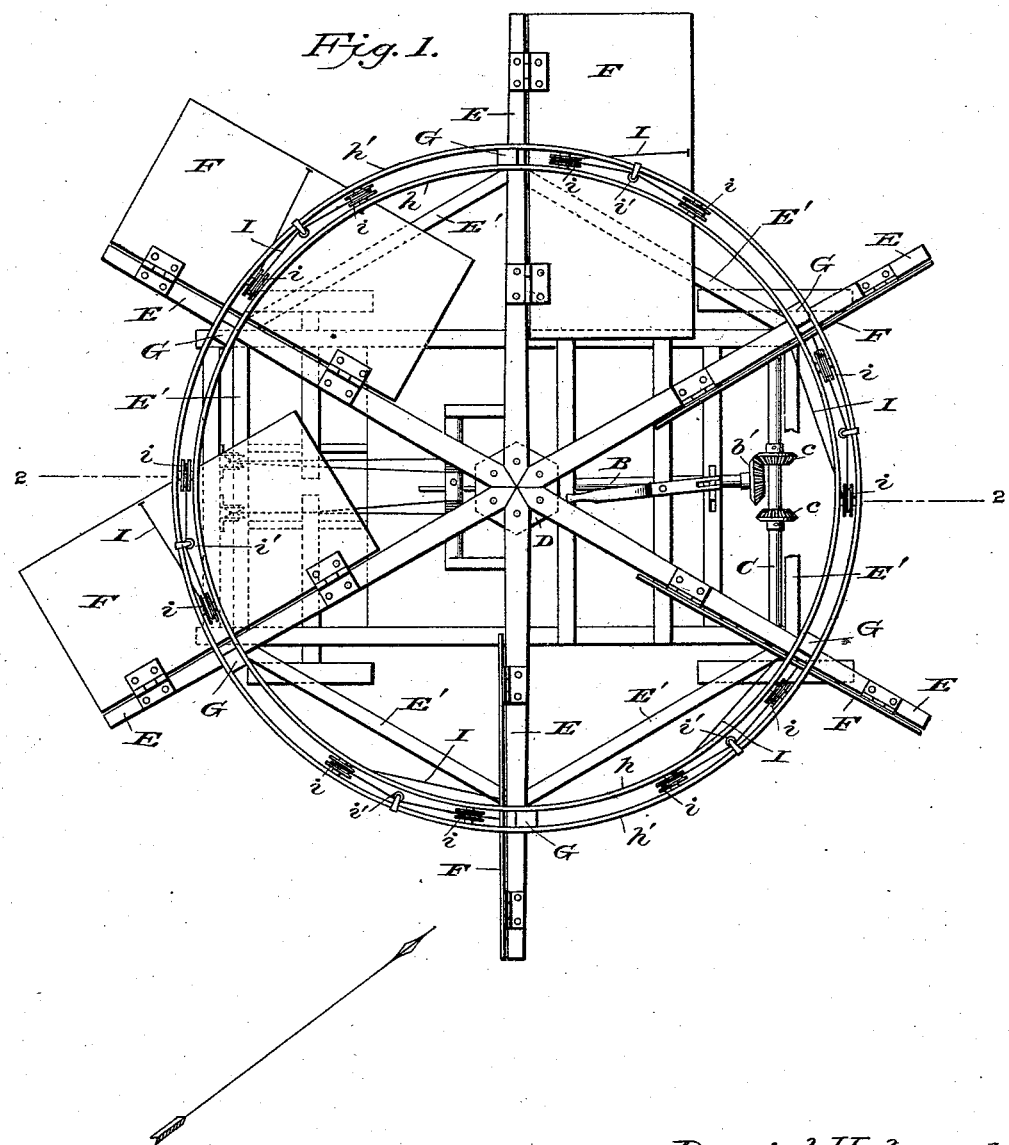
Figure 2:
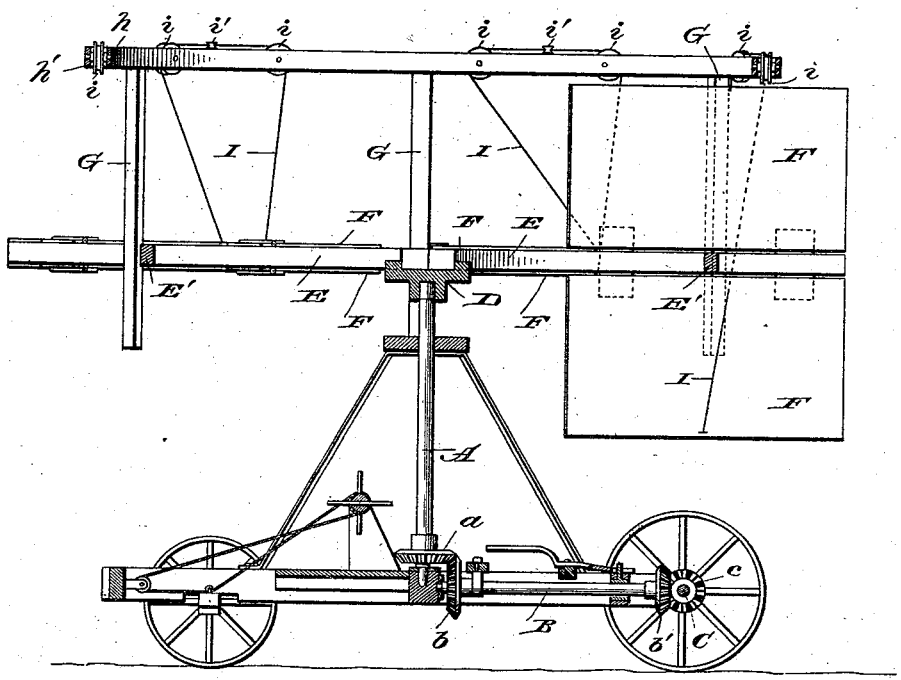
Figure 3:
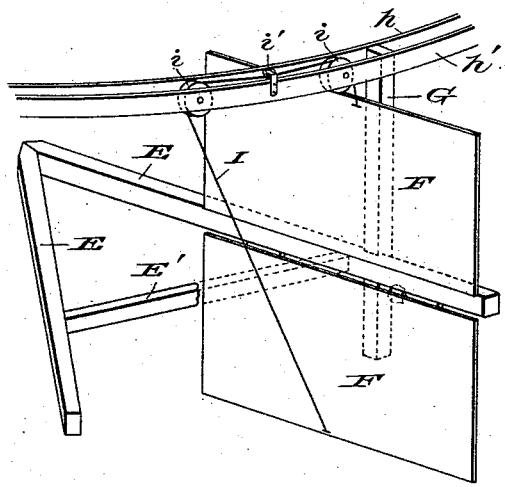

In the accompanying drawings, forming part of this specification, Figure 1 is a plan view of a wind-wheel constructed in accordance with my invention. Fig. 2 is a sectional view on the line 2—2 of Fig. 1. Fig. 3 is a detail perspective view of a portion of the wing supporting frame, showing one set of wings and their connections.

A designates a vertical shaft which is provided near its lower end with a gear-wheel $a$, the shaft being extended below the gear-wheel to rest in a suitable bearing and with the gear-wheel $a$ meshes a gear-wheel $b$ mounted on a horizontal shaft B, said horizontal shaft being used to convey power from the vertical shaft A to suitable mechanism. In the present instance I have shown my improved wind-wheel applied to a movable frame or truck mounted on wheels, the main axle being provided with gear-wheels which are adapted to mesh with gear-wheel $b'$ on the shaft B. The bearing for the outer end of the shaft B is movable in its bearing so that the gear-wheel $b'$ can be placed in gear with either one of the gear-wheels $c$ $c$ on the shaft C which carries the driving wheels of the movable frame or truck. By this arrangement the shaft B can be shifted to propel the device in either direction, and by placing the gear-wheel $b'$ at an intermediate point between the gear-wheels $c$ $c$ the shafts will be entirely out of gear.

The frame is provided at its end opposite the shaft C with axles which are pivoted to the frame at their inner ends and carrying supporting-wheels at their outer ends, as shown. To the inner ends of these pivoted axles are attached flexible connections which pass over a suitable drum so that when said drum is operated the angle of the axles will be changed and provide for guiding the frame. The truck or frame also carries inclined uprights or braces which support a platform through which the vertical shaft A passes.

By providing the truck and gearing hereinbefore described with a wind-wheel, hereinafter described, the said truck or frame can be moved from place to place.

The frame of the wind-wheel is supported by a block D which is keyed upon the upper end of the shaft A. From the block D extend radial arms E which are suitably connected to each other by cross-bars E'. To the outer end portions of the arms E are hinged wings or blades F, the upper wing being hinged to the upper side of the bar while the lower wing is hinged to the under side of the same. Each arm E has rigidly attached thereto a post G, and these posts extend above and below the arms E as shown more clearly in Fig. 2. To the upper ends of the posts are attached rings $h$ and $h'$, the ring $h$ being attached to the inner side of the posts and the ring $h'$ to the outer side to provide spaces between the rings for the reception of grooved rollers $i$. Between each pair of rollers $i$ one of the rings carries a bracket for a guide roller $i'$.

I I designate flexible connections which are attached at one end to the upper wings or blades and pass therefrom over the pulleys $i$ and $i'$ and are attached at their other end to the lower wings or blades. By this arrangement when the wings or blades are in a vertical position they will bear against the posts G and when in a closed or horizontal position they will rest upon the bars E'. In practice I prefer to construct the upper wing or blade so that it will be slightly heavier than the lower wing or blade. This may be done by increasing the size of the upper blade, or making it of heavier material, or adding a weight thereto.

It will be observed that by the construction hereinbefore described each pair of blades act independently of the others, and in operation the blades on one side of the frame will be closed while the others are open to receive the force and be acted upon by the wind.

In operation, supposing that a pair of the wings or blades are in a horizontal position they will then be against the bar E' and will present no material surface to be acted upon by the wind, but when the wheel is turned the wind will cause the blades to open against the post G and receive the full force of the wind. Now when the blades move out of the wind they will be closed by the wind pushing against the rear sides of the same, the first impulse toward closing being given by reason of the preponderance of weight of the upper blade.

Having thus described my invention, what I claim as new, and desire to secure by Letters Patent, is—

1. In a horizontal wind-wheel, the combination, of a series of radial arms having wings or blades hinged thereto, posts secured to the arms so as to extend above and below the same and against which the wings or blades bear when open, a ring attached to the posts above the blades, said ring having guide pulleys over which pass flexible connections which are attached to the edges of the blades, each pair of blades operating independently, substantially as shown and described.

2. In a wind-wheel, the combination, of a vertical shaft carrying radial arms, posts attached to said radial arms and rings secured to the upper ends of the posts, pulleys or grooved rollers journaled between the rings, and wings or blades hinged to the arms and provided with flexible connections which pass over the pulleys carried by the rings, substantially as shown and for the purpose set forth.

3. In a wind-wheel, the combination, of a vertical shaft having projecting arms connected thereto, posts carried by said arms so as to extend above and below the same, wings or blades hinged to the upper and lower sides of the arms said wings or blades being adapted to bear against the posts, and flexible connections attached to each pair of wings so that they will open and close in unison.

4. In a wind-wheel, the combination with a rotary shaft having radial arms, of wings or blades hinged to the upper and lower sides of the arms the upper blades being heavier than the lower blades, together with posts G, rings $h\ h'$ supporting grooved rollers and flexible connections attached to the wings or blades and passing over the grooved rollers, substantially as shown and for the purpose set forth.

In testimony whereof I affix my signature in presence of two witnesses.

DANIEL HOLCOMB.

Witnesses:
E. W. RYMAN,
NELLIE CALHOUN.